Figure 1:
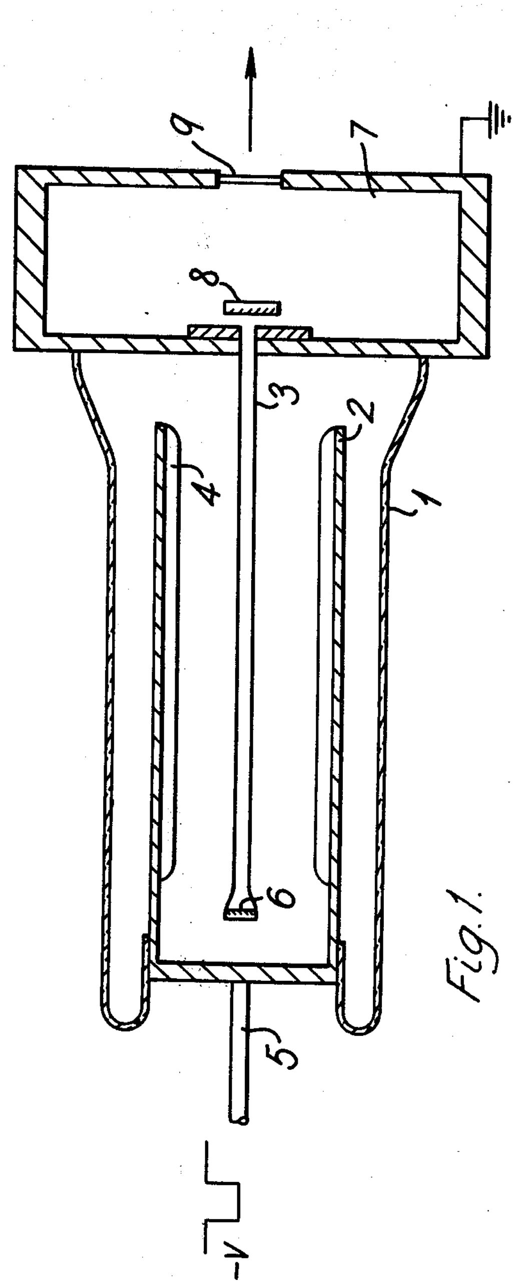

United States Patent [19]

Bradley et al.

[11] 3,983,508

[45] Sept. 28, 1976

[54] LASERS

[75] Inventors: Daniel Joseph Bradley, London; Marcus Henry Ritchie Hutchinson, Harrow, both of England

[73] Assignee: National Research Development Corporation, London, England

[22] Filed: Mar. 19, 1975

[21] Appl. No.: 559,751

[30] Foreign Application Priority Data

Mar. 29, 1974 United Kingdom............... 14102/74

[52] U.S. Cl....................... 331/94.5 PE; 331/94.5 G

[51] Int. Cl.².......................................... H01S 3/097

[58] Field of Search...................... 331/94.5; 330/4.3

[56] References Cited

UNITED STATES PATENTS 3,798,570 3/1974 Hagood et al................ 331/94.5 PE

*Primary Examiner*—William L. Sikes

*Attorney, Agent, or Firm*—Cushman, Darby & Cushman

[57] ABSTRACT

A laser comprises a cell containing xenon at high pressure and has its walls previous to high-velocity electrons. The cell is of cylindrical shape and constitutes the anode of a field-emission diode with the cathode of the diode surrounding the anode. Electrons emitted from the cathode thus travel radially inwardly and penetrate the anode walls to excite lasing action.

4 Claims, 2 Drawing Figures

LASERS

This invention relates to lasers and has particular application in lasers operating in the vacuum ultra-violet region of the spectrum below a wavelength of about 2,000A.

Suitable lasing media at such frequencies are noble gases at above atmospheric pressures and excitation is by high energy electrons. Existing configurations of laser comprise a cell containing a noble gas under pressure and having a pressure resistant window through which a high energy electron beam is directed. Since the gain of the laser depends on the length over which excitation takes place the gain in such a configuraton is limited by the width of the window that can be accommodated. Furthermore since the energy and hence depth of penetration of the electron beam is limited, excitation of the gas is restricted to a small region in the neighbourhood of the window thus preventing full utilisation of the available volume of the cell.

It is an object of the invention to provide a laser capable of operating in the vacuum ultra-violet region in which greater gain is possible.

According to the invention a laser comprises a field-emission diode of annular configuration defined between an outer cathode and an inner anode co-axial therewith, which anode is in the form of a hollow container for a high pressure gaseous lasing medium, the walls of the container being at least partly pervious to electrons emitted from the cathode, and mirrors at opposite ends of the container to enable resonance to occur therein at the lasing frequency.

With the above configuration high energy electrons penetrate the walls of the container throughout its entire length and are not limited to a particular window region. The diameter of the container can be designed so that the entire volume enclosed by the container is subject to the bombarding electrons.

To enhance the field-emission effect the inward facing surface of the cathode can be suitably shaped by the provision of field-emission points.

Figure 2:
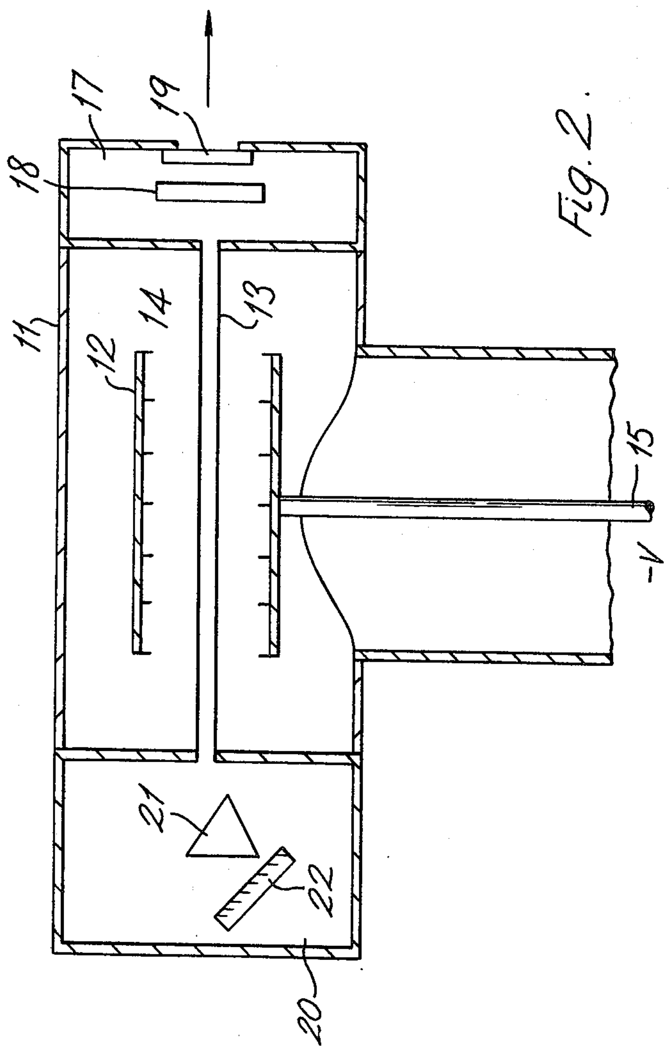

In order that the invention may be more fully understood reference will now be made to the drawing accompanying this specification in which FIG. 1 and FIG. 2 illustrate embodiments thereof in cross-section.

Referring now to FIG. 1 there is shown therein a field-emission diode defined by an insulated housing 1 the interior of which is exhaustable so that a vacuum space is defined therein. Within housing 1 there is provided a cylindrical cathode 2 and an anode 3 co-axial therewith. The inner facing surface of cathode 2 is provided with sharp edges or points 4 to concentrate the electric field so that when a suitably high potential is applied between cathode 2 and anode 3 electrons are emitted from the cathode due to a field emission effect and travel radially inwardly. Alternatively cathode 2 can be constructed of graphite. To provide a suitable operating potential cathode 2 is connected to a transmission line 5 supplied with very short high-power negative pulses or a train of such pulses. The dimensions of cathode 2 are chosen so that the impedance of the diode matches that of the transmission line.

Anode 3 is hollow and is arranged to contain a gas such as xenon under high pressure, for example of the order of 15 atmospheres. At one end of anode 3 is mounted a fully reflecting mirror 6 while the other end opens into a chamber 7 containing a reservoir of xenon. A mirror 8 is positioned near the end of anode 3 opposite to mirror 6 so that lasing action occurs between mirrors 6 and 8. Output mirror 8 is not fully reflecting so that a portion of any radiation generated between mirrors 6 and 8 will pass through an output window 9 in chamber 7.

The walls of anode 3 are constructed of a suitable metal such as stainless steel or titanium which is strong enough to resist the pressure between the xenon gas it contains and the vacuum outside but which nevertheless is thin enough to allow passage therethrough of an appreciable proportion of high energy electrons emitted from cathode surface 4. The diameter of anode 3 is chosen so that electrons which do pass through the walls of anode 3 will reach the centre of the container.

An embodiment of the invention which provides for intracavity prism tuning is illustrated in FIG. 2. The embodiment of FIG. 2 is basically similar to the embodiment shown in FIG. 1 but has pressure chambers at both ends of the anode and one of the chambers accommodates the tuning prism. In FIG. 2 an insulated housing 11 defines a vacuum space within which there is provided a cylindrical cathode 12 and an anode 13 coaxial therewith. The inner surface of cathode 12 facing anode 13 is provided with points 14 to concentrate the electric field in a similar manner to the embodiment of FIG. 1. Cathode 12 is connected to a transmission line 15 extending radially from the cathode and supplied with very short high power negative pulses to pump the laser and the cathode is impedance matched to the line 15.

Anode 13 is hollow and of similar construction to anode 3 and in operation contains a gas such as xenon under high pressure. One end of anode 13 opens into a chamber 20. A non fully reflected mirror 18 is positioned in chamber 17 and allows the laser output from anode 13 to pass out of chamber 17 through a window 19.

Chamber 20 contains a tuning prism 21 and a fully reflecting mirror 22. Mirror 22 is mounted to be parallel to the face of prism 21 facing anode 13 and both prism 21 and mirror 22 are mounted to be rotatable about an axis perpendicular to the plane of the cross-section.

The performance of the laser can be improved by inserting a wire helix within anode tube 13 of the same diameter as the diameter of tube 13. The helix eliminates reflection from the inner walls at near grazing incidence thus achieving spectral narrowing.

The operation of the laser shown in FIG. 2 is similar in all respects to that of FIG. 1 except that the laser of FIG. 2 can be tuned by rotation of prism 21 and mirror 22.

We claim:

1. A laser comprising a field-emission diode of annular configuration defined between an outer cathode and an inner anode coxial therewith, which anode is in the form of a hollow container for a high pressure gaseos lasing medium, the walls of the container being at least partly pervious to electrons emitted from the cathode, mirrors at opposite ends of the container to enable resonance to occur therein at the lasing frequency, and means for abstracting energy at the lasing frequency from the container.

2. The laser according to claim 1 characterised in that the interior of the anode communicates with a chamber at one end thereof which forms a reservoir for the gaseous lasing medium.

3. The laser according to claim 1 characterized in that the interior of the anode communicates with chambers at both ends thereof, said means for abstracting energy including a window to one of said chambers and the other of which chambers includes a tuning prism positioned between the mirrors to enable the lasing frequency to be tuned.

4. The laser as claimed in claim 1 in which the surface of the cathode facing said anode has field-emission points.

* * * * *